United States Patent [19]

Morales et al.

[11] Patent Number: 5,706,111
[45] Date of Patent: Jan. 6, 1998

[54] OPTICAL COMMUNICATIONS NETWORK

[75] Inventors: Antonio Aguilar Morales; Agustin Campos Flores, both of Madrid, Spain

[73] Assignee: Alcatel N.V., Rijswijk, Netherlands

[21] Appl. No.: 572,059

[22] Filed: Dec. 14, 1995

[30] Foreign Application Priority Data

Dec. 30, 1994 [ES] Spain ................................ 9402696

[51] Int. Cl.$^6$ ................................................ H04J 14/02
[52] U.S. Cl. ........................... 359/125; 359/127; 359/128
[58] Field of Search .................................. 359/118, 124, 359/117, 125, 128; 348/12, 16, 11; 455/5.1, 6.3; 370/120

[56] References Cited

U.S. PATENT DOCUMENTS

| | | | |
|---|---|---|---|
| 485,703 | 7/1892 | Suzuki | 359/128 |
| 5,194,977 | 3/1993 | Nishio | 359/128 |
| 5,202,780 | 4/1993 | Fussgänger | 359/125 |
| 5,221,983 | 6/1993 | Wagner | 359/125 |
| 5,321,540 | 6/1994 | Takai et al. | 359/125 |
| 5,436,748 | 7/1995 | Vinel et al. | 359/128 |

FOREIGN PATENT DOCUMENTS 2105134  3/1983  United Kingdom ............... 359/125

OTHER PUBLICATIONS

Miki et al, "A Design Concept on Fiber Optic WDM Subscriber Loop system", NTG-Fachber, vol. 73, pp. 41–45, 1980.

Goodman et al, "Design and Demonstration of the LAMBDANET System: a Multiwavelength Optical Network", IEEE Telecommunications Conference, vol. 3, pp. 1455–1457, Nov. 1987.

*Primary Examiner*—Leslie Pascal
*Attorney, Agent, or Firm*—Ware, Fressola, Van Der Sluys & Adolphson LLP

[57] ABSTRACT

For subscriber access, via optical fibre, to communications networks that offer various types of service by means of an optical access node (AN), connections between the optical network terminating units (ONT) unit to which the subscribers are connected, and the access node (AN) can be made with point-to-point or point-to-multipoint fibre optic links. The links between the access node (AN) and the switching centre (CE) are made via optical fibres through which pass the lightwave signals corresponding to a number of subscribers, multiplexed together by means of wavelength division multiplexing. This network permits access to all types of communications services in which each type of service employs a reserved wavelength for its connection between the access node (AN) and the optical network terminating equipment (ONT) unit. This reserved wavelength is fixed and depends only on the type of service.

14 Claims, 3 Drawing Sheets

OPTICAL COMMUNICATIONS NETWORK

OBJECT OF THE INVENTION

TECHNICAL FIELD

The present invention relates to an optical communications network and, more particularly, to the architecture of such a system and the nature of the signals used therein.

BACKGROUND OF THE INVENTION

As a result of the vast amount of information expected to be transmitted over future communications networks through the setting up of new user services and the advantages that optical technology offers (broad bandwidth, reliability, security, etc.), consideration is being given to the need for using completely optical networks in which both transmission and switching take place in the optical domain, thereby avoiding the successive opto-electrical conversion stages that occur in present networks. By taking advantage of the multiplexing facilities offered by optical technology in the space, time and wavelength domains, it will be feasible to transport (transmit, switch and route) large streams of information in a reliable, flexible and economical manner. By applying this concept to the access network, it will be possible for subscribers to have access in a flexible manner to the communications network or networks via optical fibers over which they will transmit and receive the necessary information in accordance with the type of service to which the subscriber in question is seeking access at any given moment.

Different optical access network configurations, between the switching centers and the optical network terminating units, permit the signals to be transported correctly between the subscribers and the center or centers to which they are connected.

Thus, for example, the European patent EP 0394728 presents one of these optical communications systems for the transmission of multiple services to a group of subscribers.

In this system, the subscribers are connected to a remote distribution unit by means of individual optical fibers, the connection between this distribution unit and the centre being made by means of a single optical fiber. In the direction from the center to the subscribers, the individual lightwave signals are transmitted on a number of wavelengths equal to the number of subscribers (8 in the case described in the document mentioned, $\lambda_1, \ldots, \lambda_8$) and the common signals on another additional wavelength $\lambda_0$ by is means of wavelength division multiplexing.

These wavelengths are separated in the remote distribution unit, such that each of the eight wavelengths $\lambda_1, \ldots, \lambda_8$ plus the common wavelength $\lambda_0$ are transmitted over the corresponding optical fiber that connects to each subscriber. Within the network terminating unit at or near the subscriber's premises detection is done, separately, of the signals associated with each of the received wavelengths.

In the other direction, from the subscriber to the exchange, the information originating at the subscriber end is transmitted over the same optical fiber but with different wavelengths ($\lambda_9, \ldots, \lambda_{16}$) to the remote distribution unit where they are combined by means of wavelength division multiplexing for the transmission of all the optical signals over a single optical fiber to the switching center.

The fact that each network terminating equipment at or near each subscriber's equipment requires an optical transmitter and receiver working at different wavelengths than the other optical transmitters and receivers for the rest of the subscriber's equipment, constitutes the main drawback due to high cost resulting from their low repetitivity factor, both in production and in installation and maintenance.

DISCLOSURE OF INVENTION

This invention concerns an access communications network, based on optical technology, located between network terminating equipment, i.e., a plurality or set of optical network termination units, on the subscriber side, and switching nodes which in general are service nodes (different types of center, transparent routing nodes, etc.), for the provision of all types of user required services: narrow and/or broadband services, distribution services (radio and TV), video on demand (VOD), etc., and even semipermanent transparent optical channels.

The connection of the optical network terminating units to their respective service nodes is made through an optical type access network or node, which provides the links with the appropriate interfaces for these networks. This gives rise to an access network infrastructure that meets the Open Network Provision requirements, that is, it provides access for the subscribers to the services offered by a multi-service and multi-operator network in which one or more types of service can be provided by one or more operators. In this last case, a subscriber may select one from a number of networks to provide him with the service required.

The optical communications network according to the invention permits subscribers to have access to one or more types of service simultaneously, by being connected to the respective switching centers or, in general, service nodes, via an access node, the connections between this access node and the center being made by means of optical fiber networks that employ wavelength division multiplexing techniques, and the connections between the access node and the network terminating units at or near the subscriber's premises being made by means of optical fiber links in point-to-point or point-to-multipoint configurations made, in the latter case, by means of a passive optical network.

This communications network, which permits the provision of various types of service (narrow band and/or broadband, distribution, video on demand -VOD-, transparent connections, connection-free services, etc.) are particularly characterized in that the access to each type of service uses a wavelength that is common for all the network terminating units at or near the various subscriber premises. In this way, each service type has a reserved wavelength which is that which will be received and/or transmitted by all network terminating units of subscribers to the type of service in question.

In the event that a user subscribes to several types of service and wishes to have access simultaneously to them, these will be transmitted over a single optical fiber at the wavelengths associated with each one, by means of wavelength division multiplexing.

The bidirectional links between a switching center and the access node are made by means of a set of optical fibers on which are multiplexed together the signals corresponding to a number of subscriber lines that are active at that moment by wavelength division multiplexing techniques.

At the access node, the conversion is made of the wavelengths used in the span from the corresponding switching centre to the access node to that associated with the service in question, and the routing of these signals to the corresponding fiber for connection to the subscribers.

In similar fashion the signals in the opposite direction are transmitted from the network terminating units at the wavelength associated with the type of service and, at the access node, the conversion takes place from this fixed wavelength to another wavelength, which will be one available from a determined number one for each subscriber. These optical signals are wavelength multiplexed for transmission to the switching center.

The above process is repeated at the access node for each type of service. The part of the access node through which access is made transparently to a determined service node is termed the Plane of Service.

With the arrangement described, it is possible, first, to have, on the subscriber side, for a given type of service, very simple and identical network terminating units since they all work at the same wavelength, consequently the cost of manufacture, installation and maintenance is much lower than if there were different terminals as is the prior art.

In addition, the provision of a new type of service can be done simply as it is only necessary to create a new plane of service in the access node, allocating to it a new wavelength, that corresponding to that type of service, and incorporate the appropriate optical transmitters and receivers in the network terminating units of those users that wish to subscribe to the new service. The incorporation of the new plane of service does not interfere with those already installed.

These and other objects, features and advantages of the present invention will become more apparent in light of the following detailed description of a best mode embodiment thereof, as illustrated in the accompanying drawing.

BEST MODE FOR CARRYING OUT THE INVENTION

Major advances are foreseen in the development of broadband services in the coming years. These services must be carried on physical media which can provide the necessary transmission capacity, as well as ensuring the reliability and confidentiality of the transmitted information.

This challenge can be most easily met by the use of optical communication systems that extend to the subscriber premises, that is, the user subscribing to services based on this type of communications network will have, at least, one optical fiber that connects to the network terminating equipment or unit which he has in or near his home or center and in which the entire path, from the switching center to the terminal, consists of optical fibers over which optical signals are transmitted. Consequently the conversion to electrical signals takes place only in the network terminating equipment to which the subscriber terminals are connected.

There are many optical communications network configurations for optical fiber subscriber access which can be more or less suitable, depending mainly on the technology available and on its cost at the time when this type of network, still essentially experimental, becomes practical on a large scale.

Figure 1:
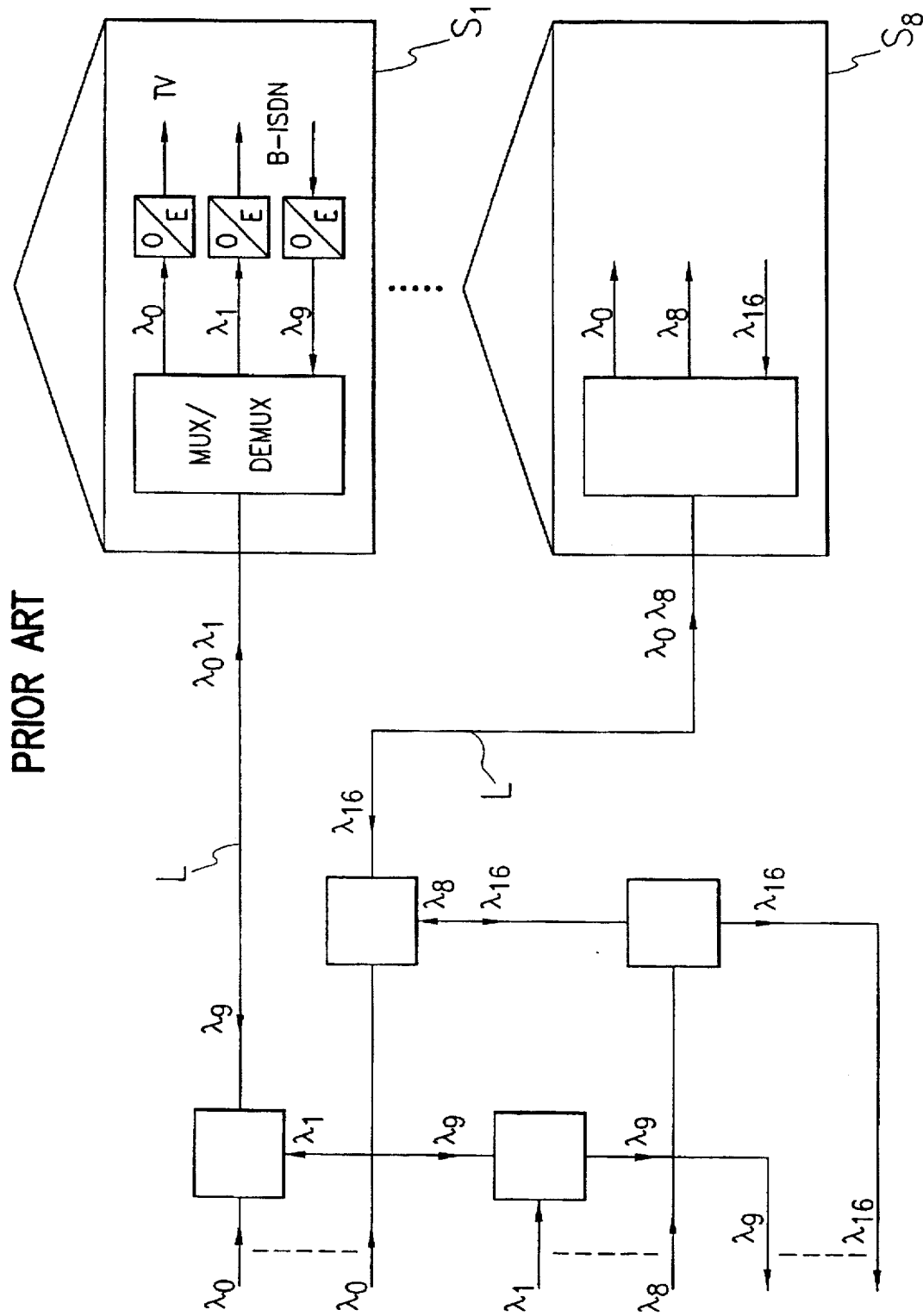
FIG. 1 shows an optical communications system, in accordance with the state of the art, for a cable television service and for a broadband integrated services digital network.

FIG. 1 shows a communications system using optical fiber, based on the aforementioned principle and according to the state of technology, for the provision of two types of digital communications service: digital cable television and integrated services digital network facilities.

In this system, each subscriber $S_1, \ldots, S_8$ has an optical fibre L over which the optical signals involved are transmitted in both directions. It can be seen that, even though all the subscribers receive the same wavelength $\lambda_0$ in the case of cable television, for the case of access to the integrated services digital network each subscriber must receive a different wavelength $\lambda_1, \ldots, \lambda_8$ from the others and transmit on another wavelength which also must not coincide with that transmitted by any of the others $\lambda_9, \ldots, \lambda_{16}$.

To this end, the subscriber terminating units, although similar to each other, are not identical since they differ, at least, in their working wavelengths.

Figure 2:
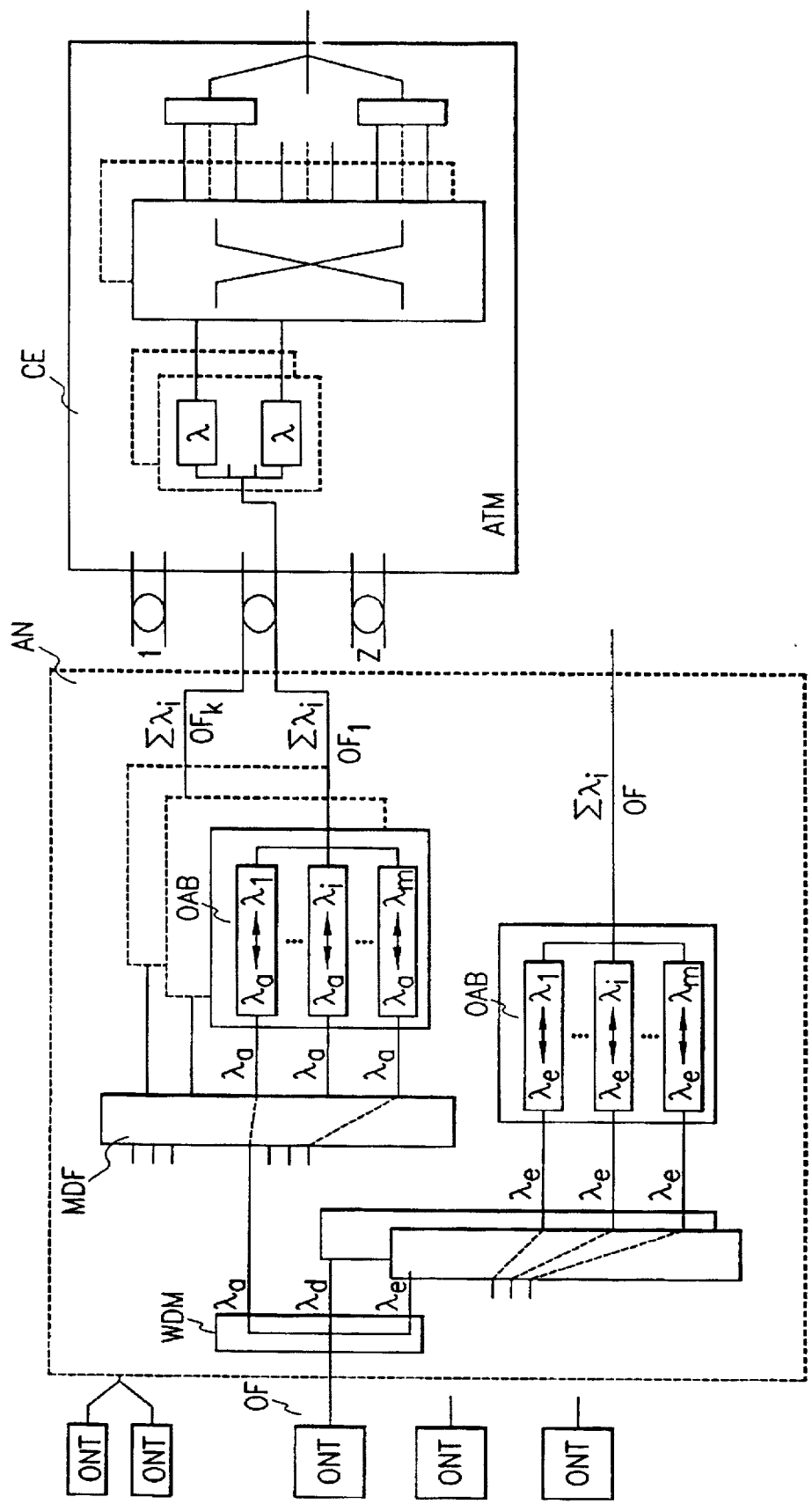
FIG. 2 shows an optical communications network in accordance with the invention for access of network terminating units to an optical type switching center.

FIG. 2 shows the configuration of a preferred implementation of a communications network, in accordance with the invention, for the provision of multiple broadband services.

This network is formed by a switching center CE of an optical type (though it may also be of the electronic type), an access node AN that concentrates and/or multiplexes the optical signals of the optical network terminating (ONT) units in order to access the optical switching centre mentioned CE and the optical fibre networks that interconnect the optical network terminating equipments ONT, the access node AN and the switching centre CE. The optical network terminating (ONT) units that are shown in FIG. 2 may each be located at or near a corresponding subscriber's premises.

This network also permits simultaneous access to the different communications services offered through the switching center CE mentioned or through other switching centers (some of these could be the same as the one mentioned but belonging to another network operator) or other service nodes (not shown); for this operational division, as far as the type of service is concerned, it is known as the "plane of service". All the planes of service are incorporated into the transport network (network core) through the access node AN to which the network terminating (ONT units) have access via optical fiber.

Each subscriber has one or two optical fibers OF over which the information corresponding to each service is received and transmitted at the respective wavelength allocated to each of the services on a permanent basis.

In the network described herein a first wavelength $\lambda_a$ is used for ATM services, a second wavelength $\lambda_d$ for television distribution services and a third wavelength $\lambda_e$ for an ether service (transparent optical channel, equivalent to a conventional leased line). In addition, there is another wavelength $\lambda_c$ for connecting to the control network (not shown). All these signals are transmitted over optical fiber OF that connect the network terminating (ONT) units to the access node AN by wavelength division multiplexing.

All the optical network terminating (ONT) units or the part corresponding to each type of service are identical to each other and serve to multiplex and demultiplex the optical signals with different wavelengths $\lambda_a, \lambda_d, \lambda_e$ corresponding to the different connections (services) requested by the subscriber so that, in this way, the different electrooptical transducers included in these terminals and corresponding to each service perform their function in complete independence from the others.

The access node AN also has a wavelength demultiplexer-multiplexer WDM for each subscriber, which demultiplexes the different wavelengths $\lambda_a$, $\lambda_d$, $\lambda_e$ of each service originating in the subscriber premises and directs each of these to the corresponding plane of service in the access node AN; in the opposite direction, it multiplexes the different wavelengths $\lambda_a$, $\lambda_d$, $\lambda_e$ coming from the corresponding planes of service in the access node AN and sends them to the subscriber premises.

It also includes main distribution frames MDF that allocate a connection to the subscribers at the access node AN in a dynamic or permanent form. These distribution frames are based on optical space switching techniques.

Finally, at the access node AN there is a set of k optical access boards OAB for each plane of service, which performs the following functions:

in the upstream direction (from subscriber to switching center), they first perform the conversion of the fixed wavelength coming from each subscriber optical network terminating unit into another wavelength $\lambda_i$ that is different for each active unit, into a set of m different wavelengths and, second, the multiplexing of the m different wavelengths over one of the optical fibers that connect to the center;

in the downstream direction (from switching center to subscriber), it performs the reverse process, that is, first the demultiplexing of the m different wavelengths received over one of the optical fibres coming from the switching center CE and the conversion of these m wavelengths into the wavelength reserved for the service in question and which will be transmitted to the subscriber premises over the corresponding fiber.

The switching center CE, which can be connected to more than one access node AN, receives the previously mentioned set of k optical fibers $OF_1, \ldots, OF_k$ over which are transmitted all the information for the m.k active subscribers for a given service.

In like manner an access node can be linked to more than one switching center. In the system of FIG. 2 the switching center CE communicates with the optical network terminating (ONT) units only for the service for which the wavelength $\lambda_a$ has been reserved (ATM service). Similarly the access node AN can be connected to other nodes that provide the same kind of service (but from a different operator), or another kind of service like, for example, television distribution or video on demand, or another type of special service.

In the case described, the switching center CE is an optical center which receives information coming from the access node AN via a set of optical fibers $OF_1, \ldots, OF_k$, in which each of them transmits, by wavelength division multiplexing, the set of wavelengths $\Sigma \lambda_i$ of the optical signals coming from a set m of optical network terminating (ONT) units. The functions of this center are to demultiplex the wavelengths received and transmit them to a means of switching for routing to other networks or other terminals connected to this center.

In the same manner as the optical network terminating (ONT) units are connected to the switching center CE and/or to other centers or service nodes via the access node AN, it is also possible for other electrooptical units to do likewise; for example, terminals belonging to an existing network (Fiber In The Loop (FITL) system line terminals, ATM MUX, etc.). In this way, the access node AN would also permit the access of these networks to the facilities or services provided by the networks that they access (virtual path and/or circuit switching and routing). In these cases, the corresponding signals that are wavelength multiplexed between the access node AN and the switching center CE would be the optical interface signals (2 Mbit/s, 155 Mbit/s, etc.) that are supplied by these units.

Figure 3:
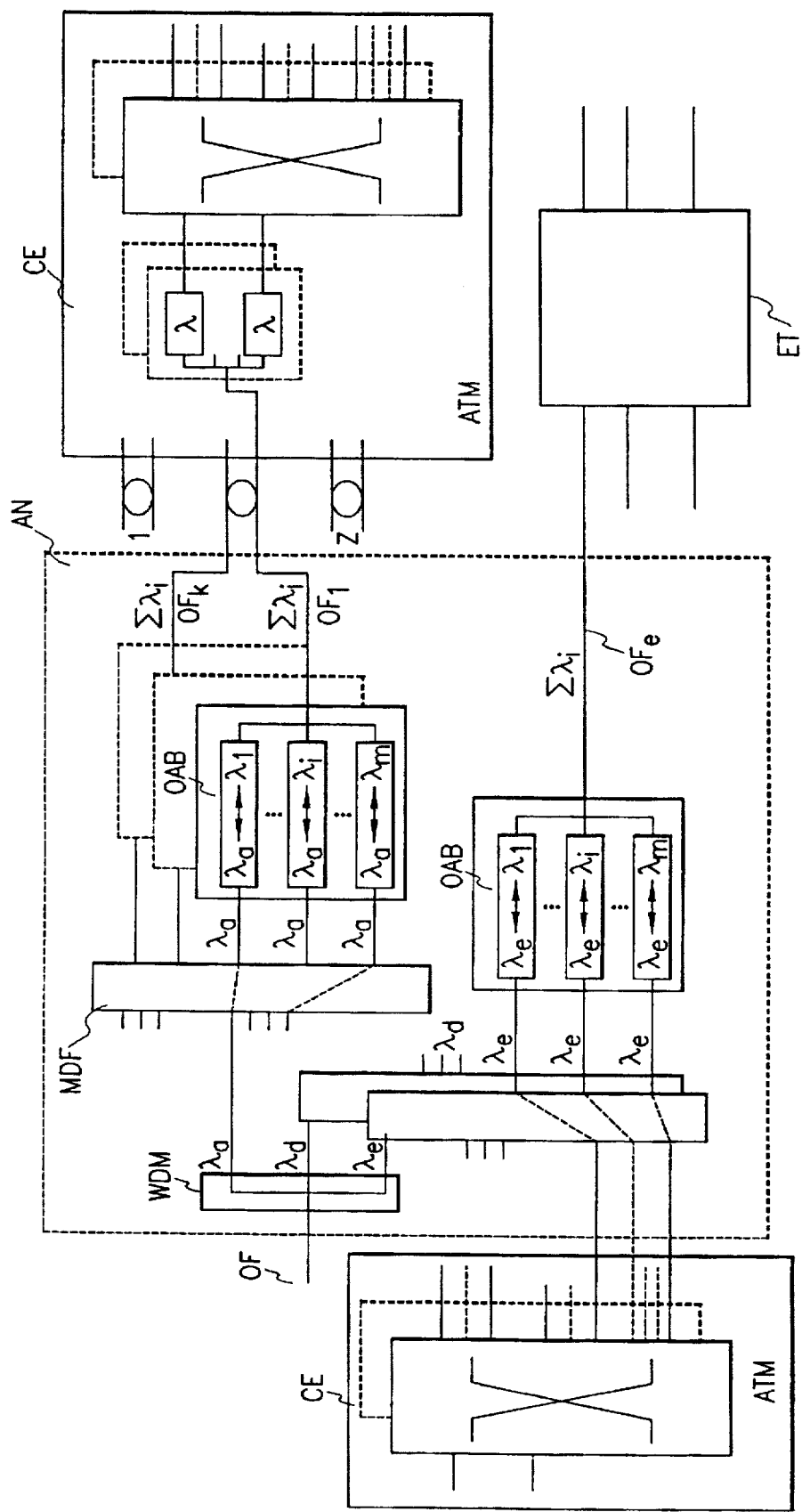
FIG. 3 shows an optical communications network as described above but which includes the connection of an ATM type optical switching center to a transparent transport network (ether service) which at the other extremity is connected to another optical switching center.

A switching center, of the ATM type for example, could also have access, via an optical type access node AN, to the transparent connection services that can be provided by an ether network. FIG. 3 shows this case in which, through the plane of service termed "ether", the links from a second switching center CE, also of the ATM type, connect with the transparent connection transport network (for example, optical type distributors) for interconnection with other switching centers. The optical fibers have access to the plane of service at the allocated wavelength.

In a similar fashion to that employed for the case of optical network terminating equipments ONT, the conversion is done of the wavelengths corresponding to the signals on the center trunks, from the allocated wavelength, for example $\lambda_e$, to a wavelength that is different for each signal $\lambda_1, \ldots, \lambda_n$, which are multiplexed for transmission over a single optical fiber $OF_e$ that is connected to the service network of the transparent transport network ET or "ether". The number of different wavelengths to be multiplexed is determined by the spacing between them which depends on the trunk transmission rate.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Optical communications network for connecting a set of optical network terminating (ONT) units to a switching center (CE), in which a transmission of signals of plural communications services between the optical network terminating units and the switching center passes, in transparent form, through an access node (AN), wherein the transmission of said signals between this access node (AN) and the switching center (CE) is done on optical fibers by wavelength division multiplexing for transmitting at least one of said communications services in different wavelengths between said access node and said switching center, wherein the transmission of signals between the access node (AN) and the optical network terminating (ONT) units is done on optical fiber, and wherein the signals that are transmitted between the access node (AN) and the optical network terminating (ONT) units do so making use of a same wavelength reserved for each communications service.

2. Optical communications network according to claim 1, wherein for multiple types of communications services transmitted between the access node (AN) and the optical network terminating (ONT) units, each type of communications service uses a different wavelength.

3. Optical communications network according to claim 2, wherein in a direction of transmission from the switching center (CE) to the optical network terminating units of various communications services, the access node (AN) performs a conversion of m different wavelengths corresponding to m optical network terminating units, into said same wavelength reserved for said same communications service.

4. Optical communications network according to claim 3, wherein the optical network terminating (ONT) units accessing different types of communications services access these different types of communications services at correspondingly different wavelengths reserved for each one of the different types of communications services over optical fibers and access these different types of communications services by wavelength division multiplexing and demultiplexing.

5. Optical communications network according to claim 2, wherein in a direction of transmission from the optical network terminating units to the switching center (CE), each different wavelength reserved for each communications service is demultiplexed in the access node (AN).

6. Optical communications network according to claim 2, wherein at the access node (AN) for each communications service, a conversion is done from a wavelength corresponding to a type of communications service to a new wavelength within a set of m possible different wavelengths, one for each optical network terminating unit subscribing to said type of communications service.

7. Optical communications network according to claim 6, wherein the m wavelengths corresponding to m optical network terminating units using a single service are multiplexed over an optical fiber that links the access node (AN) to the switching center (CE).

8. Optical communications network according to claim 1, wherein the optical fibers connecting the access node (AN) and the optical network terminating (ONT) units are allocated on a permanent basis or in a dynamic manner by means of space switching.

9. Optical communications network according to claim 1, wherein the access node (AN) also performs an interconnection between a switching center (CE) for a given service and a service node of a center of a transparent transport network (ET).

10. Optical communications network for connecting a set of optical network terminating (ONT) units to a switching center (CE), in which a transmission of signals between the optical network terminating units and the switching center passes, in transparent form, through an access node (AN), wherein the transmission of signals between this access node (AN) and the switching center (CE) is done on optical fibers by wavelength division multiplexing for transmitting at least one communications service in different wavelengths between said access node and said switching center, wherein the transmission of signals between the access node (AN) and the optical network terminating (ONT) units is done on optical fiber, and wherein the signals that are transmitted between the access node (AN) and the optical network terminating (ONT) units do so making use of a same wavelength reserved for a same communications service, wherein for multiple types of communications services transmitted between the access node and the optical network terminating (ONT) units, each type of communications service uses a different wavelength, and wherein in a direction of transmission from the switching center (CE) to the optical network terminating units of various communications services, the access node (AN) performs a conversion of m different wavelengths corresponding to m optical network terminating units, into said same wavelength reserved for said same communications service.

11. Optical communications network according to claim 10, wherein the optical network terminating (ONT) units accessing different types of communications services access these different types of communications services at correspondingly different wavelengths reserved for each one of the different types of communications services over optical fibers and access these different types of communications services by wavelength division multiplexing and demultiplexing.

12. Optical communications network for connecting a set of optical network terminating (ONT) units to a switching center (CE), in which a transmission of signals between the optical network terminating units and the switching center passes, in transparent form, through an access node (AN), wherein the transmission of signals between this access node (AN) and the switching center (CE) is done on optical fibers by wavelength division multiplexing for transmitting at least one communications service in different wavelengths between said access node and said switching center, wherein the transmission of signals between the access node (AN) and the optical network terminating (ONT) units is done on optical fiber, and wherein the signals that are transmitted between the access node (AN) and the optical network terminating (ONT) units do so making use of a same wavelength reserved for a same communications service, wherein for multiple types of communications services transmitted between the access node and the optical network terminating (ONT) units, each type of communications service uses a different wavelength, and wherein in a direction of transmission from the optical network terminating units to the switching center (CE), each different wavelength reserved for each communications service is demultiplexed in the access node (AN).

13. Optical communications network according to claim 12, wherein at the access node (AN) for each communications service, a conversion is done from a wavelength corresponding to a type of communications service to a new wavelength within a set of m possible different wavelengths, one for each optical network terminating unit subscribing to said type of communications service.

14. Optical communications network according to claim 13, wherein the m wavelengths corresponding to m optical network terminating units using a single service are multiplexed over an optical fiber that links the access node (AN) to the switching center (CE).

* * * * *

UNITED STATES PATENT AND TRADEMARK OFFICE
CERTIFICATE OF CORRECTION

PATENT NO. : 5,706,111
DATED : January 6, 1998
INVENTOR(S) : Aguilar Morales et al It is certified that error appears in the above-identified patent and that said Letters Patent is hereby corrected as shown below:

On the title page:

ITEM: [19], line 2, please cancel "Morales et al." and substitute therefor --Aguilar Morales et al.--.

ITEM: [56], line 3, please cancel "485,703 7/1892" and substitute therefor --4,845,703 7/1989--.

ITEM: [57], line 4, after "(AN),", please insert --the--;

at line 5, after "(ONT)", please cancel "unit"; and at line 16, please cancel "equipment".

Signed and Sealed this

Nineteenth Day of May, 1998

Attest:

BRUCE LEHMAN

*Attesting Officer*     Commissioner of Patents and Trademarks